(12) United States Patent
Lobmaier (10) Patent No.: US 9,143,930 B2
(45) Date of Patent: Sep. 22, 2015

(54) SECURE ELEMENT FOR MOBILE NETWORK SERVICES

(75) Inventor: Markus Lobmaier, Vienna (AT)

(73) Assignee: KWallet GmbH, Vienna (AT)

( * ) Notice: Subject to any disclaimer, the term of this patent is extended or adjusted under 35 U.S.C. 154(b) by 274 days.

(21) Appl. No.: 13/880,422

(22) PCT Filed: Oct. 20, 2010

(86) PCT No.: PCT/EP2010/065831
§ 371 (c)(1),
(2), (4) Date: Apr. 19, 2013

(87) PCT Pub. No.: WO2012/052056
PCT Pub. Date: Apr. 26, 2012

(65) Prior Publication Data
US 2013/0273889 A1      Oct. 17, 2013

(51) Int. Cl.
*H04M 1/00* (2006.01)
*H04W 12/00* (2009.01)
*H04W 12/08* (2009.01)

(52) U.S. Cl.
CPC .............. *H04W 12/00* (2013.01); *H04W 12/08* (2013.01)

(58) Field of Classification Search
CPC ... G06Q 20/40; G06Q 20/3278; G06Q 20/02; H04W 12/08; H04W 12/00
USPC ......................................................... 455/411
See application file for complete search history.

(56) References Cited

U.S. PATENT DOCUMENTS

| 2010/0138518 | A1* | 6/2010 | Aiglstorfer et al. ........... 709/219 |
| 2010/0291896 | A1* | 11/2010 | Corda .......................... 455/410 |
| 2011/0053504 | A1* | 3/2011 | Corda ......................... 455/41.1 |
| 2011/0296521 | A1* | 12/2011 | Bernabeu ....................... 726/19 |
| 2012/0130838 | A1* | 5/2012 | Koh et al. .................... 705/26.1 |
| 2012/0246404 | A1* | 9/2012 | Malzahn et al. ............. 711/115 |

OTHER PUBLICATIONS

"GlobalPlatform's Proposition for NFC Mobile: Secure Element Management and Messaging". GlobalPlatform. Apr. 2009.*

* cited by examiner

*Primary Examiner* — Nathan Mitchell
(74) *Attorney, Agent, or Firm* — Dennemeyer & Associates, LLC (57) ABSTRACT

In a secure element (4) that comprises an application (17B) and/or a security domain (17A) a mode is proved, in which mode a transfer of data (AD) to said application (17B) and/or security domain (17A) requires pre-authorization.

2 Claims, 4 Drawing Sheets

SECURE ELEMENT FOR MOBILE NETWORK SERVICES

FIELD OF THE INVENTION

The invention relates to a secure element.

The invention further relates to a mobile device that comprises a secure element according to the first paragraph.

The invention further relates to a method of operating a secure element.

The invention further relates to a computer program comprising software code adapted to perform the steps of the method according to the preceding paragraph.

The invention also relates to a method of operating a mobile communication network.

The invention also relates to a method of doing business.

The invention further relates to a method of enabling access to a secure element.

The invention also relates to a signal conveying a command for a secure element.

BACKGROUND OF THE INVENTION

A secure element (SE) is known from the "GlobalPlatform's Proposition for Near Filed Communication (NFC) Mobile: Secure Element Management and Messaging—White Paper, April 2009", herein referred to as GPWP, and the GlobalPlatform Card Specification Version 2.1.1, March 2003, herein referred to as GPCS. The SE is the component in a mobile handset, e.g. a mobile phone, a PDA, a tablet PC and the like, or the SE is the component of a UICC or a microSD, corresponding to or to be plugged into a mobile device, that provides the security and confidentiality required to support various business models in a fast evolving business environment, in which several entities or players, in addition to Mobile Network Operators (MNO), will become involved in an NFC mobile ecosystem.

Throughout the application an MNO shall mean a party that provides mobile network services for mobile devices, e.g. mobile phones, to allow communication according to the GSM, or UMTS, or WLAN technology or the like and related standards successor standards or technologies. NFC shall mean a communication according to ISO 14443, 18092, 21481 ECMA 340, 352, 356, 362 or ETSI TS 102 190, as well as any successor standard or technology. From a customer centric point of view, the MNO provides full range mobile services to the customer as stated in the document "Mobile NFC Services", Version 1, February 2007, of the GSM Association.

The SE satisfies the need for ongoing security and confidentiality of sensitive applications and data downloaded to and stored on an NFC enabled handset for performing contactless business transactions. The GlobalPlattform, acting as a cross-industry organization, intends to define and provide the specification, at present available in form of the GPCS, necessary to support three types of SE selected as options for NFC. These are Universal Integrated Circuit Cards (UICC) that can be plugged into said mobile handsets, Embedded Secure Elements that are embedded during manufacturing of said mobile handsets either independent form a subscriber identification module (SIM) or comprised in such a SIM used to identify a mobile network user or its handset, and Secure Memory Cards that are used to securely store, transport and/or transfer information. Typically in a Global System for Mobile Communications (GSM) network, the UICC contains a SIM application and in a Universal Mobile Telecommunications System (UMTS) network it is the USIM application.

In the GPWP three main configuration scenarios of the SE are proposed. The first configuration scenario is Simple Mode, which is an issuer centric model, where card content management is only performed by the MNO but is monitored by the Trusted Service Manager (TSM). The second configuration scenario is Delegated Mode, where card content management can be delegated to a TSM but each operation of card content management requires pre-authorization from the MNO. The third configuration scenario is Authorized Mode, where card content management is fully delegated to a TSM for a sub area of the SE. Accordingly the present version of the GPCS defines an appropriate card architecture to be supported by the SE.

Although these three modes allow for a wide deployment of business cases, they still lack in supporting particular business cases. But these particular business cases will become of utmost importance for making NFC based mobile phone operation interesting for all business partners involved.

Therefore it is an object of the present invention to overcome the aforementioned problem and to provide an improved secure element, an improved mobile device, an improved method of operating a secure element, an improved computer program, and an improved method of operating a mobile communication network, an improved method of doing business, and a method of enabling access to a secure element, as well as a signal conveying a command for a secure element.

SUMMARY OF THE INVENTION

The object as defined above is achieved by a secure element that comprises an application and/or a security domain, characterized in that the secure element provides a mode, in which mode a transfer of data to said application and/or security domain requires pre-authorization.

Further to this, the object is achieved by a mobile device, in particular a mobile phone that is near field communication enabled, characterized in that the mobile device comprises a secure element according to the invention.

This object is also achieved by a method of operating a secure element, wherein the secure element comprises an application and/or a security domain, characterized in that a mode is executed, in which mode a transfer of data to said application and/or security domain requires pre-authorization.

This object is also achieved by a computer program (product) comprising software code adapted to perform the steps of the method of operating a secure element according to the invention when executed on a programmable secure element.

Further to this the object is achieved by a method of operating a mobile communication network, the network comprises at least one mobile device that comprises a secure element, wherein a first party is responsible for the secure element, and the secure element comprises an application and/or a security domain for which an application provider/service provider that is different from the first party is responsible, and the method comprises the steps of transferring data for said application and/or security domain via an over-the-air link from a second party to the mobile device, wherein the application provider/service provider bears responsibility for the data, characterized in that a pre-authorization is acquired by the second party from the first party and provided to the secure element, wherein the secure element provides a mode in which a transfer of data to said application and/or security domain requires pre-authorization.

Further to this the object is achieved by a method of doing business by means of a communication network, the communication network comprises at least one mobile device that comprises a secure element, wherein a first party is responsible for the secure element, and the secure element comprises an application and/or a security domain for which an application provider that is different from the first party is responsible, wherein the method of doing business comprises the steps of organizing by a data management system a pre-authorization for a transfer of data to said application and/or security domain, and submitting the data and the pre-authorization to the secure element via a communication link in said communication network, and assigning by a data management system a monetary value in form of value data to each event of granting said pre-authorization or a group of pre-authorizations.

Further to this the object is achieved by a method of enabling access to a secure element, the secure element comprises an application and/or a security domain, characterized in that the secure element provides a mode, in which mode a transfer of data to said application and/or security domain requires pre-authorization, the method comprises the steps of receiving a request to grant access to said secure element, characterized in that the request concerns to a transfer of data to said application and/or security domain and a pre-authorization is returned, which pre-authorization is used by the secure element to allow said transfer of data to said application and/or security domain.

Further to this the object is achieved by a signal conveying a command for a secure element, said secure element comprises an application and/or a security domain and the secure element provides a mode, in which mode a transfer of data to said application and/or security domain requires pre-authorization, the signal comprises signal portions to be used as pre-authorization in the secure element for a transfer of data to said application and/or security domain.

In the context of the invention the expressions " . . . the secure element provides a mode, in which mode a transfer of data to said application and/or security domain requires pre-authorization . . . " shall mean in the context of a device that " . . . the secure element is designed to execute a mode, in which mode a transfer of data to said application and/or security domain requires pre-authorization . . . ", or in the context of a method that " . . . the secure element executes this mode when data are received and processes said pre-authorization accordingly . . . ".

Throughout this application definitions provided in the GPCS are deployed as far as possible, if not specified otherwise. Therefore the following definitions shall apply:

"Secure element" (SE) shall mean a Universal Integrated Circuit Card (UICC), an Embedded Secure Element, and a Secure Memory Card like a microSD Card, or any other integrated circuit that satisfies the need for ongoing security and confidentiality of sensitive applications and data downloaded to and stored on an NFC enabled handset for performing contactless business transactions. The Universal Integrated Circuit Card or the microSD Card are designed to be plugged into said mobile device in order to provide several functionalities but also to enable the mobile device, e.g. NFC enabled handset, in which they are plugged in, to access and use its secure element properties/functionalities. The SE may also be realized as an NFC sticker that can be glued onto a mobile device and that is designed to passively communicate via a NFC protocol.

"Application" shall mean an instance of an Executable Module after it has been installed and made selectable.

"Executable Module" contains the on-card executable code of a single Application present within an Executable Load File.

"Executable Load File" shall mean an actual on-card container of one or more Application's executable code (Executable Modules).

"Security Domain" shall mean an on-card entity providing support for the control, security, and communication requirements of the Application Provider "Application Provider" shall mean an entity that owns an Application and is responsible for the Application's behaviour. According to the GPWP the Application Provider may be a Service Provider. The Service Provider may develop its own Application or may outsource the development of such an Application to an Application Developer.

"Service Provider" shall mean an entity that provides contactless services to the Customer. Without any claim of completeness a Service Provider may be a bank, a public transport company, a loyalty program owner etc. as published in Mobile NFC Services, Version 1, of the GSM Association.

Further to this, following the document Mobile NFC Services, Version 1, of the GSM Association:

"Customer" or in other words end user shall mean somebody that uses a mobile device for mobile communication and mobile NFC services. The Customer subscribes to an MNO and uses mobile NFC services.

"Retailer/Merchant" may be a person or an entity that is typically—but not necessarily—different from the Service Provider.

"Application Developer" shall mean an entity that designs and develops the Mobile NFC Application.

The measures according to the invention allow the execution of more advanced business models having a higher degree of attractiveness for all parties (business partners) involved as it was possible under the known GPCS. The key to these advanced business models is an improvement in the SE as outlined above and a different interaction of the business partners involved in a mobile communication network. In order to better understand the differences between the inventive technical measures and the technical measures provided under the existing GPCS, the existing GPCS is elaborated in more details at herein below. In contrast to the invention the known GPCS takes account of pre-authorization only in the case of Card Content management in a Delegated Management mode. For the sake of clarity it is outlined that:

"Card Content" shall mean code and Application information (but not Application data) contained in the card that is under the responsibility of the OPEN e.g. Executable Load Files, Application instances, etc;

"OPEN" shall mean the central on-card administrator that owns the GlobalPlatform Registry;

"GlobalPlatform Registry" shall mean a container of information related to Card Content management;

"Delegated Management" shall mean pre-authorized Card Content changes performed by an approved Application Provider.

Delegated Management takes into account the possibility that the Card Issuer may not necessarily want to manage all Card Content changes, especially when the Card Content does not belong to the Card Issuer.

"Card Issuer" shall mean an entity that owns the card and is ultimately responsible for the behaviour of the card.

According to the known GPCS Card Content management encompasses the capability for the loading, installation, removal and extradition of Card Content. Here the OPEN is responsible for the Card Content management even though a Security Domain receives the initial request (APDU commands).

"Application Protocol Data Unit (APDU)" shall mean a standard communication messaging protocol between a card accepting device and a smart card.

In the Delegated Management a close co-operation between the OPEN and the Issuer Security Domain is required.

"Issuer Security Domain" shall mean an on-card entity providing support for the control, security, and communication requirements of the Card Issuer.

Cryptographic security is required for Delegated Management and the Issuer Security Domain requires the knowledge of keys and algorithms used for Tokens.

"Token" shall mean a cryptographic value provided by a Card Issuer as proof that a Delegated Management operation has been authorized.

According to the known GPCS Delegated Management is a privilege that a Security Domain shall be granted during installation. Delegated Management requires an Application Provider's Security Domain with these privileges to perform: delegated loading (requires pre-authorization), delegated installation (requires pre-authorization), delegated extradition (requires pre-authorization), and delegated (no pre-authorization required). Delegation gives the Card Issuer the possibility of empowering partner Application Providers the ability to initiate approved and pre-authorized Card Content changes (load, install, or extradition). According to the type of empowerment, a load Token, an install Token, or an extradition Token are used according to the known GPCS. A Token is a signature of an INSTALL (for load) command, an INSTALL (for install) command or INSTALL (for make selectable) command, or an INSTALL (for extradition) command. A Token is calculated by a token calculation using on the one hand fields of the respective INSTALL command and on the other hand an issuer token calculation key. The calculated Token is appended to the INSTALL command concerned.

According to the known PGCS, in terms of securing content loading and installation, the responsibility to ensure that controls are present and correct rests with the OPEN. The OPEN, on receiving a request from a Security Domain with Delegated Management privileges, shall request the Issuer Domain to verify the validity of the Token and shall act appropriately if the Issuer Security Domain cannot verify the Token.

Here the invention gains importance and solves the problem that according to the known GPCS Delegated Management concerns the Application only, but not the Application data. As the Application data can be modified arbitrarily under the regime of the known GPCS, the deployment of attractive business models is not possible.

According to the invention Application data management now also requires pre-authorization. This can be achieved in various ways. Basically the concept of pre-authorization for the transfer of Application data can be independent from any of the existing modes of the known DPCS (Simple Mode, Delegated Mode, Authorized Mode) or any existing security mechanisms implemented in the SE according to the known DPCS. This means that the pre-authorized transfer of Application data may also be possible to the Issuer Security Domain or the Card Issuer Application provided, however, that the central administrator of the SE keeps the validation of the pre-authorization under control.

The dependent claims and the subsequent description disclose particularly advantageous embodiments and features of the invention.

Dependent on the various possible scenarios in the market, the identity of the first party and the second party may be selected accordingly.

In a preferred embodiment the first party may by the MNO providing mobile communication services and the second party may be the TSM providing trusted service management for Applications and/or security domains in the SE to the Application Provider. However, according to the various businesses concerned the first party may also be a mobile device manufacturer supplying the mobile device preferably comprising an embedded secure element. The first party may also be a Service Provider providing general services, e.g. financial services or administrative services, but also a Retailer/Merchant retailing products, goods and/or services may be concerned to be in the role of the first party.

According to one particular embodiment of the method of doing business the first party and the second party may be identical, which means one and the same party. Hence also the TSM may distribute SEs, e.g. embedded in micro secure digital (SD) cards that can be plugged into modern mobile phones, wherein the micro SD card comprises the NFC functionality and the SE functionality. The mobile phone may be designed to communicate with said micro SD card such that the SE is reachable by the TSM via an over the air link. As the SE belongs to the TSM the TSM—acting as the owner of the SE—by itself can grant pre-authorization for the data transfer. In this particular embodiment the first and the second data management system may also be one and the same, so to say combined in only one computer device. In case that two different data management systems are involved, both will belong to the TSM. In this scenario the TSM may even invite other TSMs acting now as Service Providers, even such TSMs operating as competitors, to participate in the use if its SE. Hence even such competitors may contribute to the revenue stream of the TSM as an owner of the SE. Hence those other TSMs together with general Service Providers may use the SE to operate individual Application and to manage the Application data according to the invention.

However, dependent on the particular design chosen for the implementation of the SE and the particular ownership assigned to it, the party being entitled with ownership of the SE is in control of the commercial access to the Application as well as to the Application data and may roll out its business model in form of a method of doing business according the invention. In particular, the invention allows a transaction based invoicing for services, wherein advantageously it is not any more necessary that only the MNO is the owner of the SE.

Hence, according to an exemplary aspect of the method of doing business, said mobile phone manufacturer distributing NFC enabled mobile phones with embedded SE according to the invention may grant permission to a Service Provider, e.g. a financial service provider or a Retailer/Merchant for services or for goods or a transport company etc., to distribute e.g. vouchers as Application data via the service of a TSM into its SE to mobile phone users using the mobile phone of the mobile phone manufacturer. In this scenario the mobile phone manufacturer can act as the owner of the SE and control the transaction based business model.

According to another exemplary aspect of the method of doing business also a first Service Provider being the owner of the SE according to the invention that is embedded e.g. in a micro SD card may distribute these micro SD cards under its customers. The customers may plug the micro SD cards into NFC enabled mobile devices—hence, now acting as a Customer—and the first Service Provider may grant permission to other (second) Service Providers (in the role of the Application Provider) to distribute e.g. vouchers as Application data via the service of a TSM into the SE of the micro SD card in the mobile phones of its customer. In this scenario the first Service Provider is the owner of the SE and can control the transaction based business model.

According to another exemplary aspect of the method of doing business also a financial Service Provider may be in the possession of the SE and may therefore charge other Application Providers for updates of the Application data according to the invention.

There may also be scenarios in which one mobile device is equipped with a number SEs, e.g. several SEs in one mobile phone by means of several SIM cards installed or several microSD cards plugged into the mobile phone or several SEs fixedly installed in the mobile phone.

In all possible scenarios thinkable, the present invention provides the advantage that the party that is responsible for the SE, which would typically be the owner of the SE, is enabled to establish a transaction based revenue generation just by granting pre-authorization for a transfer of Application data to the Application and/or the Security Domain in its SE. Said transactions may be individually charged or invoiced by way of collective invoices for a number of transactions.

The implementation of the new mode in the SE according to the invention may be performed by submitting the Application data to be transferred to the Application and/or the Security Domain to the central administrator of the SE and the central administrator may do that via a back channel communication using an existing communication channel or an individual communication channel directly requesting pre-authorization from the first party, e.g. the MNO that is the owner of the SE and that owns the Card Issuer Domain and consequently has an interest in controlling the transfer of Application data. Here the MNO controls the transaction based business model. In this scenario the SE may be embedded in a SIM, the SIM may by plugged into an NFC enabled mobile phone and the communication between a baseband controller of the phone and the SE on the SIM may be performed by means of a single wire protocol (SWP).

The implementation of this new mode in the SE may also be performed similar to the above-described processes applied for Delegated Management as specified in the known GPCS. This can be achieved by means of a modified STORE DATA command, when compared with the known GPCS. In analogy to the known (first) STORE DATA command, also the new (second) STORE DATA command is used to transfer Application data to an Application or the Security Domain processing the command. Here a token is appended to the new STORE DATA command. The token was calculated by using same or similar token calculation methods as described for the INSTALL command according to the known GPCS. The on-card administration of the new STORE DATA command may then be the same as for the INSTALL command, which means that the afore-mentioned close co-operation between the OPEN and the Issuer Security Domain secures the integrity of card architecture. In fact the Card Manager is modified to process the new STORE DATA command accordingly. This new security logic implemented in a SE according to the invention creates an extended Delegated Management for Application data, which is different from the known Delegated Management according to the known GPCS, because Card Content now explicitly also comprises Application data. Hence it allows an update of the Application or, in other words, an update of the content of the Application in a delegated mode of transfer of data, in which delegated mode said transfer of data can be delegated to a party, but said party trying to initiate or execute the transfer of Application data to an Application and/or Security Domain must obtain a pre-authorization from another party before the transfer may take place.

The delegated mode for transferring Application data to an Application and/or a Security Domain may be performed or provided by a runtime environment of the SE. However, according to a preferred embodiment of the present invention it is proposed that the Card Manager of the SE is designed to validate the pre-authorization and to act according to the result of the validation, which means the Card Manager transfers the Application data to the Application and/or the Security Domain if the validation is affirmative or it rejects the transfer if the validation is non-affirmative. This implementation is of particular interest, if the inventive concept of pre-authorization for an Application data transfer needs to be implemented in the scope or context of a GlobalPlatform implementation of a SE. Here the use of the Card Manager that is modified to support the inventive concept of pre-authorization for an Application data transfer preserves the security handling already implemented in accordance to the known GPCS and only requires minor modifications in terms of making the Card Manager able to handle the new "delegated mode", in particular the new STORE DATA command.

In particular, the Card Manager shall be designed to verify if a data-transfer-token is valid or not in order to check the pre-authorization. Again, this implementation also allows for a wide deployment of already existing security algorithms in the existing GPCS and consequently only minor modifications may be necessary in order to achieve an operation of the SE under the new "delegated mode".

The SE according to the invention may be embedded in any mobile device technically designed to support NFC based mobile services. The term "embedded" may mean e.g. to be comprised in an exchangeable subscriber identification module (SIM), or an exchangeable microSD card, or to be fixedly integrated in a non-exchangeable manner in said mobile device, e.g. as part of the electrical circuitry of the mobile device. According to a preferred embodiment of the invention the mobile device is a mobile phone, which, at present, seems to accelerate the market penetration of the invention and its associated business model tremendously. But also other devices may be concerned.

The various aspects and effects elaborated in detail above also apply to the respective independent method claims specifying a method of operating an SE. Therefore a repetition is avoided.

The realization of the SE may be based on hardware that is designed to provide the features according to the invention e.g. by means of programmable logic arrays or application specific integrated circuits. The invention may also be realized by means of an SE that is processor based, wherein the processor may comprise or may be connected to memory circuitry in order to access a computer program stored in the memory circuitry. The computer program comprises software code adapted to perform the steps of the method according to the invention when executed by the processor. This solution allows flexible updates and maintenance of the computer program.

When applying an inventive new SE in a mobile communication network, e.g. in a mobile phone that is NFC enabled, a method of operating a communication network according to the invention can be performed, as stated initially. A business method targeted by this operation may comprise said first party that may be a MNO operating a first computer based data management system that is connected to a first over-the-air communication stage for performing over-the-air communication e.g. with the mobile phone. In this exemplary scenario the MNO is responsible for the SE, hence, the MNO is the owner of the SE.

Said second party may be the Service Provider that is different from the MNO and that is responsible for the Application and/or Security Domain. However, advantageously said second party is a TSM operating a second computer based data management system, wherein the second party is responsible for said transfer of the data to the mobile device on behalf of the Service Provider. The second data management system may be connected to the Internet or to a second over-the-air communication stage so that communication can take place between the MNO and the TSM in order to acquire a pre-authorization from the MNO. In a preferred embodiment of the invention the TSM acquires a data-transfer-token from the first party as a pre-authorization, in particular via an Internet based communication channel. The data-transfer-token is computed by the first party according to a token computation algorithm by using the data—in particular Application data—received upfront from the second party and a private key of a key pair of the first party. In the Issuer Security Domain the SE preferably comprises the public key of the owner of the SE, e.g. the MNO, to verify the data-transfer-token.

As a central authority in its role as owner of the SE, the owner, e.g. the MNO, logs each event or group of events of providing a pre-authorization to the TSM, or optionally, directly to the Service Provider. Each logged event or group of events is assigned a monetary value to be paid by the TSM or the Service Provider to the owner of the SE, e.g. the MNO. The TSM or a Service Provider will typically have a pre-agreed relationship (e.g. contractual relation) with the TSM or the owner of the SE, e.g. the MNO.

In a particular scenario the further party may be a Service Provider in the form of a Retailer/Merchant, e.g. a company operated under the brand name BIPA that is the owner of a loyalty program. Here the Retailer/Merchant is responsible for its Application and the Application data stored in the SE. The Application data represent vouchers available to customers of the Retailer/Merchant.

This inventive method of operating a mobile communication network, in particular the concept of acquiring pre-authorization and logging the event of granting pre-authorization, allows an execution of a business model to generate a revenue stream that is use based.

The method of operating said communication network may also involve a number of owners of SEs, e.g. MNOs, and a number of TSMs as well as a number of Service Providers. Depending on the actual assembly of the parties involved and the actual infrastructure, either the TSM (e.g. on behalf of a Service Provider, a mobile phone manufacturer etc.) and/or the Service Provider itself may manage the pre-authorization and/or submission of Application data to the targeted SE or the targeted group of SEs.

Although throughout this patent application the Application data are explained to represent a voucher, it is evident to those skilled in the art that also other items (e.g. flight tickets, monetary value items, loyalty points, and so on) may be concerned by the Application data to be transferred to the Application and/or the Security Domain in accordance with the present invention.

Other objects and features of the present invention will become apparent from the following detailed descriptions considered in conjunction with the accompanying drawings. It is to be understood, however, that the drawings are designed and the description shall only be used for the purposes of illustration of the invention and not as a definition of the limits of the invention.

DETAILED DESCRIPTION OF EMBODIMENTS

Figure 1:
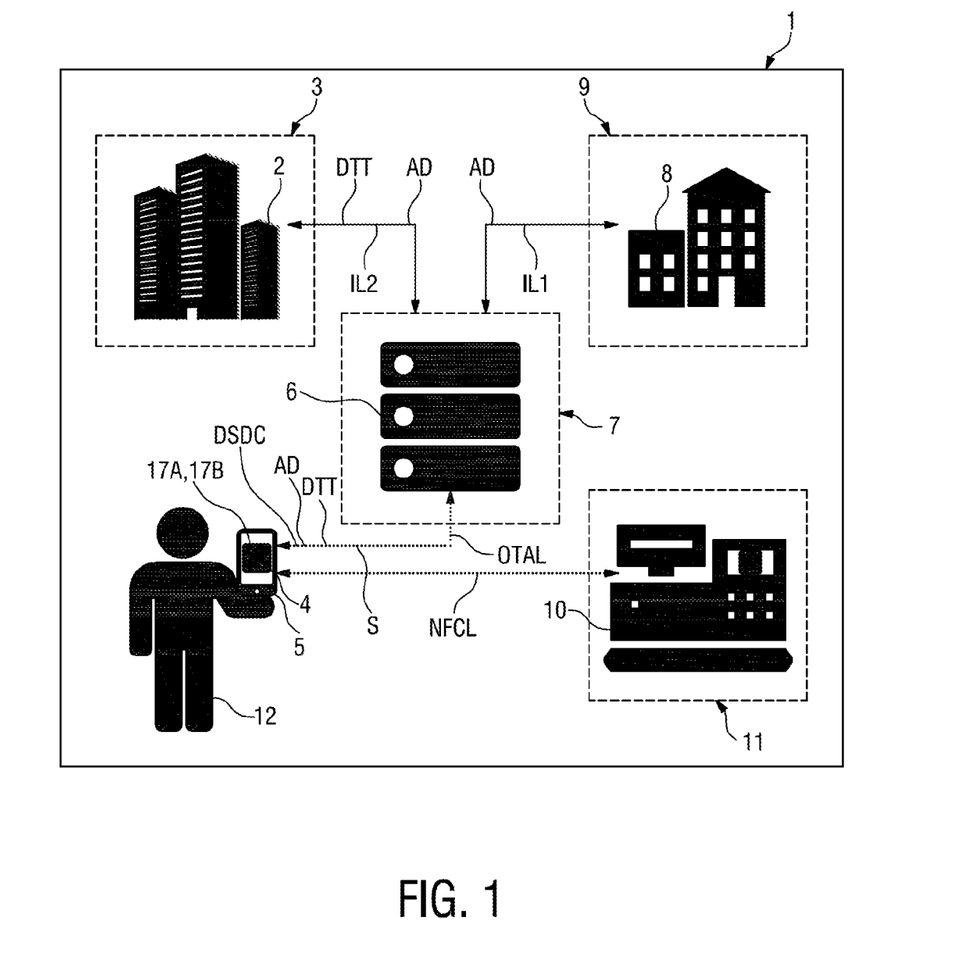
FIG. 1 schematically shows a system according to the invention,
FIG. 2 schematically visualizes a method of operating a mobile communication network according to the invention in form of a flow chart,
FIG. 3 schematically depicts an architecture of a secure element according to the invention,
FIG. 4 schematically visualizes a method of operating a secure element according to the invention in form of a flow chart.

In FIG. 1 a system 1, or—in other words—a communication network according to the invention is depicted. The system 1 comprises:
  a first computer based data management system 2 operated by a first party, which is a MNO 3—the MNO 3 owns a number of SEs of which only one SE 4 is depicted as part of a mobile phone 5 in FIG. 1.
  a second computer based data management system 6 operated by a second party, which is a TSM 7—the TSM 7 is a trusted party that is appointed or authorized by the MNO 3 to serve other parties than the MNO 3 in managing the Card Content of the SE 4 and also Application data AD for Applications 17B or Security Domains 17A (see also FIG. 3) stored in the SE 4.
  a third computer based data management system 8 operated by a third party, which is a Service Provider 9—the Service Provider 9 is the owner of an Application 17B and a Security Domain 17A managed by the TSM 7 in the SE 4 of the MNO 3—herein the Service Provider acts as Application Provider.
  a register 10 of a point of sale 11 also operated by the Service Provider 9, wherein the register 10 is NFC enabled—e.g. by means of a separate NFC reader or an integrated NFC communication/reader module—so that communication in form of NFC can take place with another device, e.g. the NFC enabled mobile phone 5;
  the mobile phone 5 used by a mobile phone user 12, wherein the mobile phone 5 comprises the SE 4 according to the invention, which is owned by the MNO 3. The mobile phone 5 is logged in into the mobile communication network of the MNO 3 and the mobile phone 5 is NFC enabled so that communication in form of NFC can take place with another device, e.g. the register 10 of the electronic point of sale 11. Amongst other features implemented according to the known GPCS, the SE 4 provides a mode, in which mode a transfer of the Application data AD to the Application 17B stored in the SE 4 requires pre-authorization by the MNO 3. The mode is a "delegated mode", wherein said transfer of Application data AD can be delegated by the Service Provider 9 to the TSM 7. In particular each transfer of Application data AD requires pre-authorization of the MNO 3. The delegation, the provision of pre-authorization and the submission of the Application data AD to the mobile phone 5 is all performed by the interaction between the computer-based data management systems 2, 6 and 8.

The system 1 as depicted in FIG. 1 represents an NFC eco-system, which allows generating recurring revenue. The recurring revenue is generated by a use-based business model, which is based on the concept that each time an electronic voucher of the Service Provider 9 is transmitted to the mobile phone the Service Provider 9 is charged a certain amount.

In the following it is assumed that the SE 4 of the mobile phone 5 comprises the Application 17B, for which the Service Provider 9 is responsible in its role as Application Provider. It is also assumed that on behalf of the Service Provider 9 the Application 17B has already been uploaded to the SE 4 by the TSM 7, e.g. in the Delegated Management mode according to the existing GPCS. The Application 17B allows the user to display vouchers on the display (not shown) of the mobile phone 5 and to selectively redeem the vouchers at the point of sale 11 via NFC. A voucher is represented by Application data AD stored in the SE 4 and the process of submitting the Application data AD to the SE 4 is the subject of a method of operating the system 1.

Figure 2:
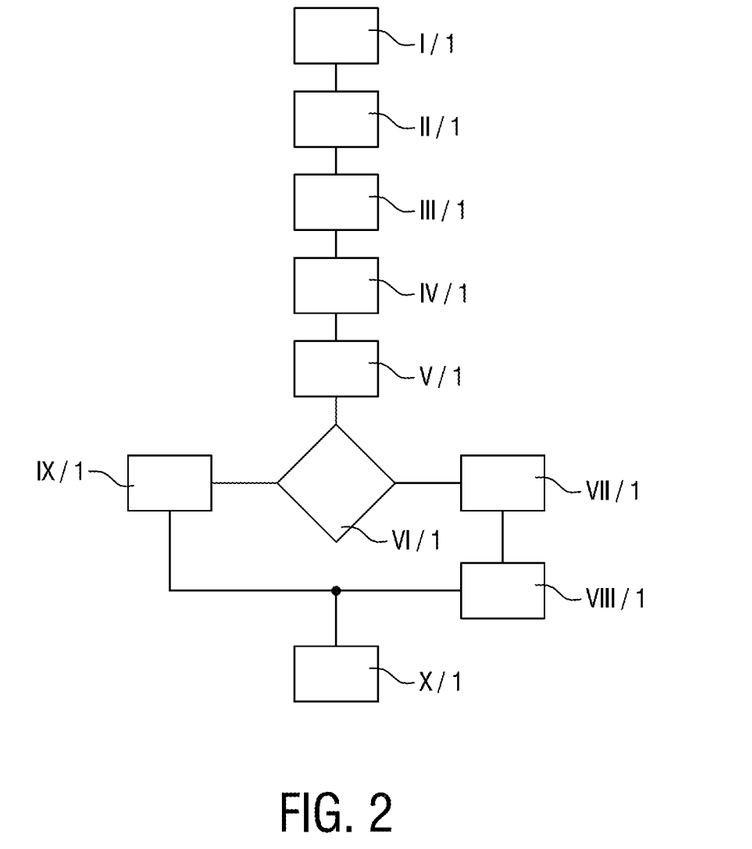

Under the framework of the above-mentioned frame condition the first method according to the invention, which is a method of operating a mobile communication network, is discussed in the following by the aid of FIG. 2 to which reference is made.

In a block I/1 the first method starts. In a block II/1 the Service Provider 9 requests the TSM 7 to deliver new Application data AD to its Application 17B in the SE 4. This request is communicated to the TSM 7 via a first Internet based communication channel IL1 (depicted in FIG. 1).

In a block III/1 the TSM 7 requests a pre-authorization for this process from the MNO 3. In this request the TSM 7 submits the Application data AD to the MNO 3 via a second Internet based communication channel IL2 (depicted in FIG. 1). As the TSM 7 is a trusted party in the NFC eco-system, the TSM 7 has also got knowledge of the SE 4 to be addressed with the respective voucher and therefore also the respective SE 4—e.g. by means of its unique identification number—is indicated as part of the request to the MNO 3. To complete the information available at the MNO 3 for granting the pre-authorization also the Application Provider concerned, which is the Service Provider 9, is made known to the MNO 3.

In a block IV/1 the MNO 3 grants pre-authorization for the transfer of the Application data AD to the Application 17B, where the Application data AD are processed, e.g. stored for later use as voucher. The first data management system 2 of the MNO 3 generated a data-transfer-token DTT in a token calculation process. The data-transfer-token DTT is appended to the Application data AD and the Application data AD together with the appended data-transfer-token DTT are delivered to the TSM 7 via said second Internet based communication channel IL2. As a crucial control point of a new business model the MNO 3 now logs each event or group of events of providing a pre-authorization to the TSM 7 and the logged event or group of events is assigned a monetary value to be charged—e.g. at a later moment in time in form of a collective invoice—by the MNO 3 from the TSM 7 and consequently indirectly via the TSM 7 from the Service Provider 9, or directly from the Service Provider 9 as the case may be. Hence, from a point of view of the MNO 3, the MNO 3 performs a method of enabling access to the SE 4, wherein the MNO 3 receives a request to grant access to said SE 4 and returns a pre-authorization, which is used by the SE 4 to allow said transfer of Application data AD to said Application 17B and/or Security Domain 17A.

In a block V/1 the TSM 7 delivers the Application data AD together with the pre-authorization via an OTA communication channel/link OTAL to the mobile phone 5, where the Application data AD together with the appended data-transfer-token DDT are made available to the SE 4. In the OTA communication channel/link OTAL a signal S is used that comprises signal portions that represent the Application data AD and the data representing the data-transfer-token DDT used for pre-authorization in the SE 4.

In the course of these method steps a pre-authorization is acquired by the TSM 7 from the MNO 3 and provided to the SE 4. As stated above, the SE 4 provides a delegated mode in which a transfer of Application data AD to the Application 17B requires a pre-authorization. In a block VI/1 this mode is executed and the delivered pre-authorization is validated by the SE 4 before the Application data AD are transferred to the Application 17B. As the MNO 3 owns the SE 4 the SE 4 has inherent knowledge about verification of the data-transfer-token DTT.

If the validation is successful, the Application data AD are transferred to the Application 17B in a block VII/1 where they are/can be processed. An acknowledgment of transfer of the Application data AD to the Application 17B is generated by the SE 4 and provided to the TSM 7 via said OTA communication channel/link OTAL in block VIII/1.

If the validation of the pre-authorization fails, the delivery of the Application data AD to the Application 17B is rejected by the SE 4. This status is provided to the TSM 7 via said OTA communication channel/link OTAL in a block IX/1.

The first method ends in a block X/1.

Figure 3:
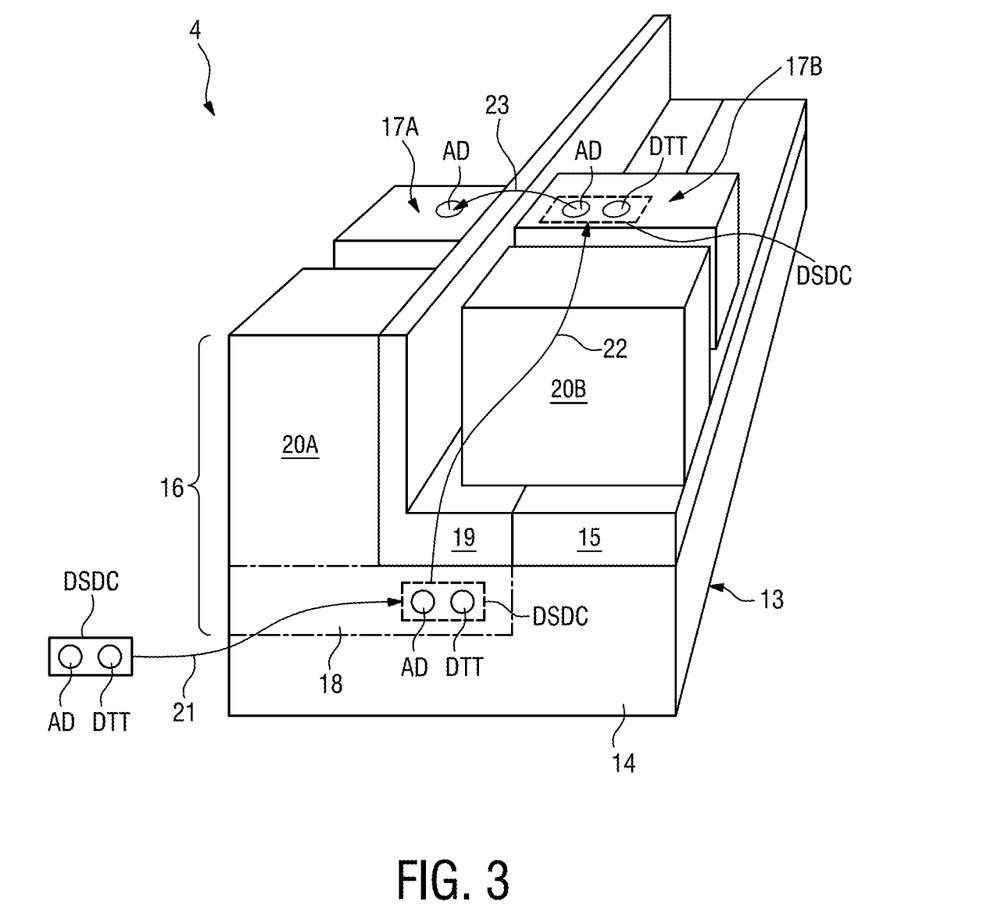

In the following, with reference to FIG. 3, a card architecture 13 of a SE 4 used in above method is described. This card architecture 13 shows a runtime environment 14 that includes a hardware neutral Application Programming Interface (API) 15 to support application portability. The card architecture 13 further comprises a Card Manager 16 that is the primary GlobalPlatform card component. It acts as the central administrator for the GlobalPlatform card. Special key and security management applications called Security Domains e.g. 17A and 20A, are created to ensure complete separation of keys between the Card Issuer, which is the MNO 3 introduced above (in the present context e.g. ORANGE Austria) that owns an Issuer Security Domain 20A, and multiple Application Providers, hereinbefore termed the Service Provider 9 (in the present context e.g. BIPA) introduced above that owns an Application Provider Issuer Domain 17A. The Card Manager 16 comprises the OPEN 18, the GlobalPlatform API 19 and the Issuer Security Domain 20A. The Issuer Security Domain 20A holds sensible information in form of data regarding the MNO 3. Beside the Issuer Security Domain 20A also a Card Issuer Application 20B is depicted that belongs to the MNO 3.

According to the present embodiment the SE 4, which contrasts the existing GPCS, the Card Manager 16 is designed in such a way that the Delegated Mode of the existing GPCS is extended to support a delegated STORE DATA command DSDC, which is schematically indicated as a block in the Figure. Amongst other parameters necessary to process this command the delegated STORE DATA command DSDC comprises the (ciphered) Application data AD and the data-transfer-token DTT. Hence, a special—new—"delegated mode" is provided, in which "delegated mode" a transfer of Application data AD by the delegated STORE DATA command DSDC to the Application 17B requires pre-authorization.

The Card Manager 16 acting as the central administrator is designed to receive the delegated STORE DATA command DSDC from a TSM 7 (indicated by arrow 21) as outlined in the context of FIG. 1 and to validate the data-transfer-token DTT. Validation means checking the data-transfer-token DTT if it is validly generated and provided by the MNO 3 or not. If validity is confirmed, the pre-authorization exists. Cryptographic security is required for the delegated STORE DATA command DSDC and the Issuer Security Domain 20A has the knowledge of keys and algorithms used for tokens and token validation. In particular the Issuer Security Domain 20A has knowledge of a token verification public key of the MNO 3 to perform the verification of the data-transfer-token DTT. As soon as the validation of the data-transfer-token DTT is completed by the central administrator, the Card Manager 16 forwards the delegated STORE DATA command DSDC to the Application 17B of the retailer 9 (indicated by arrow 22). The Application 17B performs the processing of the delegated STORE DATA command DSDC, which means that the ciphered Application data AD are deciphered by using a public key of the Service Provider 9 that is stored in the Security Domain 17A of the Service Provider 9. Thereafter the deciphered Application data AD are stored in the Security Domain 17A of the Service Provider 9 (indicated by arrow 23).

Figure 4:
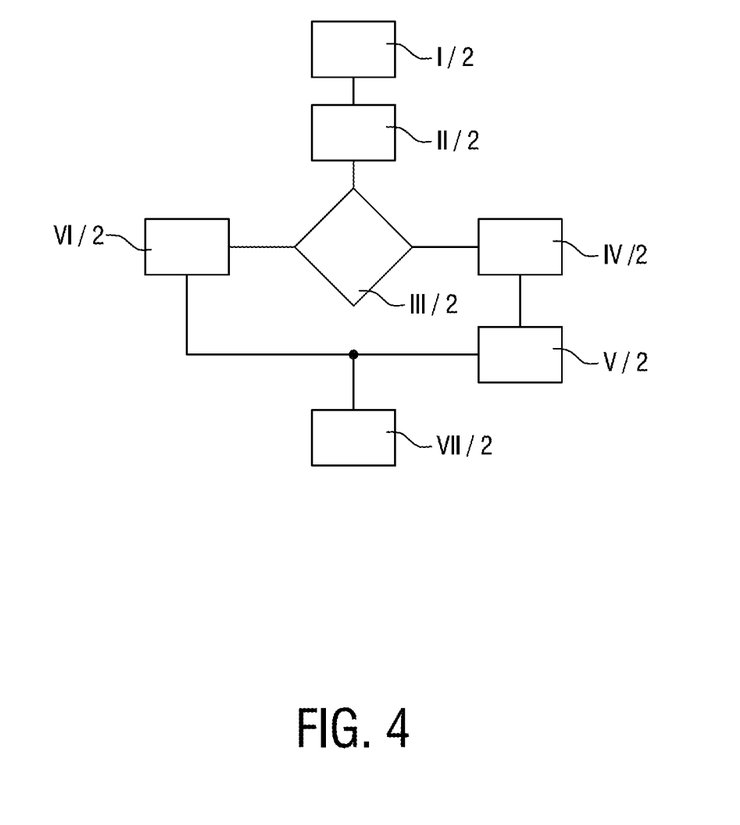

With reference to above-made description of the architecture of the SE 4 according to the invention, in the following, while reference is made to FIG. 4, a second method according to the invention, which is a method of operating said SE 4, is elaborated.

The second method starts in a block I/2. In a block II/2, upon receipt of a delegated STORE DATA command DSDC intended to be processed by the Application 17B of the Service Provider 9, the central administrator (Card Manager 16) of the SE 4 executes said new delegated mode (now termed "delegated STORE DATA mode"), wherein said transfer of Application data AD can be delegated from the Service Provider 9 to the TSM 7, but each transfer of Application data AD to the Application 17B of the Service Provider 9 requires pre-authorization from the MNO 3.

In this delegated STORE DATA mode, as indicated by a block III/2, the Card Manager 16 embedded in the card architecture 13 of the SE 4 acting as the central administered of the SE 4 checks the pre-authorization. In details the check is performed by the OPEN 18, which co-operates with the Issuer Security Domain 20A from where a token verification public key is acquired in order to perform the verification of the data-transfer-token DTT appended to the delegated STORE DATA command DSDC. The algorithms used for token validation, which make use of the acquired token verification public key, are embedded in the OPEN 18.

If the Card Manager 16 confirms validity of the data-transfer-token DTT, it propagates the delegated STORE DATA command DSDC to the Application 17B of the Service Provider 9 for which the delegated STORE DATA DSDC command is intended and where the delegated STORE DATA command DSDC is processed, which means that the Application data AD representing vouchers are stored in the Security Domain 17A of the Service Provider 9 and the existence of new vouchers can be displayed on the display of the mobile phone 5. The delegated STORE DATA command DSDC is propagated in a block IV/2 and processed by the Application 17B in a block V/2.

If the Card Manager 16 does not confirm validity of the data-transfer-token DTT, it does not propagate the delegated STORE DATA command DSDC to the Application 17B of the Service Provider 9 for which the delegated STORE DATA command DSDC is intended. In this case the Card Manager 16 generates an error message and this error message is returned to the TSM 7 via said OTA communication channel/link OTAL, where it can be further processed. The error message is generated in a block VI/2.

The second method ends in a block VII/2.

By using the SE 4 according to the invention in a system 1 according to the invention, a method of doing business (MDB) according to the invention is possible. The MDB is elaborated in the following.

According to this MDB the Service Provider 9 uses the third data management system 8 to cipher personalization data (Application data AD representing the voucher for the user) with its private key of its key pair. The ciphered Application data AD are intended for the Application 17B already stored in the SE 4 of the user's mobile phone 5. Given the fact that the Application 17B belongs to the Service Provider 9, the Application 17B has inherent knowledge about the processing of the ciphered Application data AD including deciphering by means of a public key of the Service Provider's 9 key pair. As these aspects do not concern the present invention they will not be discussed in more detail. However, the third data management system 8 also holds information related to customer (e.g. the user 12) of the Service Provider 9 and is connected (not shown) via an Internet connection to the register 10 of the retailer 9 where the vouchers stored in the NFC enabled mobile telephone 5 of the user 12 can be redeemed by the aid of an NFC communication link NFCL. Hence data concerning voucher and customer can be consolidated by the third data management system 8.

The ciphered Application data AD are submitted via said first Internet based communication channel IL1 to the TSM 7 where they are processed by the second data management system 6. Also information is submittal, wherein said information relates to the user 12 and allows identifying said user 12 for whom the voucher is intended. The second data management system 6 has inherent knowledge about the link between the user 12 and the SE 4 to be addressed. Also the link (ownership relation) between the SE 4 and the MNO 3 owning the SE 4 is known to the second data management system 6. Hence, upon receiving the ciphered Application data AD these Application data AD are submitted to the first data management system 2 of the MNO 3, where a hash value is generated from the Application data AD and the hash value is signed/ciphered by a private key of the Issuer Security Domain 20A. The so generated data-transfer-token DTT is returned from the first data management system 2 of the MNO 3 to the second data management system 6 of the TSM 7 where the delegated STORE DATA command DSDC is assembled. As such, the TSM 7 organizes by means of the second data management system 6 said pre-authorization for a transfer of the Application data AD to said Application 17B and/or Security Domain 17A.

Now the second data management system 6 submits the delegated STORE DATA command DSDC including the ciphered Application data AD and the data-transfer-token via an OTA communication channel/link OTAL to the mobile phone 5 concerned and the mobile phone 5 of the addressed user 12 forwards the delegated STORE DATA command DSDC to the SE 4, where it is processed according to above made explanations. In summary the Application data AD provided by the Service Provider 9 are only processed by the Application 17B of the Service Provider 9 if the Card Manager 16 of the SE 4 can affirmatively validate the data-transfer-token DTT. Otherwise the ciphered Application data AD will not be transferred to the addressed Application 17B.

The implementation of a pre-authorization by the MNO 3 via said data-transfer-token DTT now provides the basis for a use-based business model, in which the MNO 3 logs each request for a pre-authorization and/or each generation of such a pre-authorization in form of the data-transfer-token DTT. Each such activity or group of activities is assigned a monetary value in form of first value data that are processed by the first data management system 2. In the present embodiment the first value data are electronically submitted to a bank institute (not shown) where the amount indicated by the first value data is transferred from the account of the TSM 7 to the account of the MNO 3 according to the pricing model agreed between the TSM 7 and the MNO 3.

On the other side, also the TSM 7 logs the number of vouchers submitted to the SEs 4 in the filed (the NFC ecosystem). Also here second value data are managed by the second data management system 6. In the present embodiment the second value data are electronically submitted to a bank institute where the amount indicated by the second value data is transferred from the account of the Service Provider 9 to the account of the TSM 7 according to the pricing model agreed between the Service Provider 9 and the TSM 7.

The user 12, once informed of a successful processing of the Application data AD transferred to the Application 17B of the Service Provider 9 by the aid of the delegated STORE DATA command DSDC, which is indicated on the display of the mobile phone 5 in form of an availability indication regarding new vouchers, may use/redeem the vouchers at the NFC enabled register 10 of the Service Provider 9. Therefore an NFC communication link NFCL is established between the register 10 and the mobile phone 5. Again a delegated STORE DATA command DSDC needs to be sent to the SE 4 in order to manipulate/change the Application data AD so that the use or consumption of a voucher is appropriately reflected by the Application data AD. The required data-transfer-token DTT may be requested according to the procedure explained above for loading the vouchers up into the SE 4. Hence, an online connection will be established between the register 10 and the third data management system 8 and the third data management system 8 requests the data-transfer-token DTT via the TSM 7 from the MNO 3. The data-transfer-token DTT received from TSM 7 is propagated in real time from the third data management system 8 to the register 10 and from there via the NFC communication link NFCL to the mobile phone 5 and finally to the SE 4 where the delegated STORE DATA command DSDC is processed according to the invention. This procedure is possible if the acquisition of the data-transfer-token DTT can be performed relatively fast.

If there are significant delays for the acquisition and/or delivery of the date-transfer-token DTT to be taken into account, other methods can be considered. For example, it would also be possible that upfront to the use of a data-transfer-token DTT a bulk of data-transfer-tokens DTT can be purchased by a Service Provider 9. These pre-purchased data-transfer-tokens DTT can be pre-distributed to local registers 10 where they can be used according to actual demand. According to another example, also a special—e.g. pre-purchased—date-transfer-token DTT, e.g. a so termed "register available data-transfer-token" can be pre-installed in the register 10 and does not need to be changed each time NFC based amendments of the Application data AD are performed in the SE 4 by means of a delegated STORE DATA command DSDC. Such a special pre-authorized date-transfer-token DTT may have infinite lifetime. In a preferred scenario the special data-transfer-token DTT may have a finite lifetime or its use may be limited according to a pre-defined number of uses. It may be available only in terms of consumption of vouchers or other items digitally represented in the SE 4 by the Application data, so to say for reducing the number of or consumption of e.g. vouchers, but not for increasing the number or uploading and establishing of these items.

From the above made explanations it shall be clear that the method step of acquisition of a pre-authorization by obtaining the data-transfer-token DTT and delivering the data-transfer-token DTT to the SE 4 is not limited to a communication link making use of an over-the-air-communication link OTAL. Not necessarily, but preferred when consumption of e.g. vouchers is concerted, the pre-authorization for writing Application data AD into the SE 4 may be performed via a NFC based communication link NFCL, e.g. at the register 10. Therefore the NFC enabled part of the register 10 shall not only support a read mode but also a support a NCF based write mode.

Throughout the preceding description of the embodiment of the invention the invention was mainly explained with a focus on the use of vouchers. However, it shall be clear that the invention may also be applied in various other fields or applications.

One of the possible use cases may concern the filed of electronic ticketing. Here the Application data AD representing tickets may be pre-authorized written into the SE 4 by means of an over-the-air communication link OTAL. Later, the tickets stored in the SE 4 may than be pre-authorized used by means of an NFC communication link NFCL at a security turnstile to enter an event location, e.g. a station for football games. Hence the owner of the SE 4, e.g. MNO may have full control about the economic value of the method of writing Application data AD in a pre-authorized mode into the SE 4. The first pre-authorized write process establishes the ticket electronically in the SE 4, while the second pre-authorized write process consumes the ticket stored in the SE 4. Each time a revenue can be generated at the side of the owner of the SE 4.

According to a further use case of the invention electronic (e.g. prepaid) payments are concerned. According to this embodiment an electronic purse application (e.g. known under the synonym Quick used in the Austrian Bankomat environment) may be used in the SE 4. Again the owner of the SE 4 may economically benefit from each transaction of increasing the monetary values by means of a pre-authorized write process of the Application data AD into the SE 4, this time for uploading money into the electronic purse. In addition, the owner may also economically benefit from each transaction of decreasing the monetary value by means of a pre-authorized write process of Application data AD into the SE 4, this time for spending money out of the electronic purse at e.g. an NFC enabled point of sale.

As an advantage of the present invention it is emphasized that the particular inventive design of the SE 4 on top of the existing (known) GPCS enables a business model that is use or transaction based for NFC services to be deployed in the near future.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the illustration enumerating several means, several of these means may be embodied by one and the same item. The mere fact that certain individual measures/features are recited in mutually different dependent claims does not indicate that a combination of these measures/features cannot be used to advantage.

The invention claimed is:

1. A method of operating a mobile communication network (1), the network (1) comprises:

at least one mobile device (5) that comprises a secure element (4), wherein a first party (3) is responsible for the secure element (4), and the secure element (4) comprises an application (17B) and/or a security domain (17A) for which a service provider (9) that is different from the first party (3) is responsible, the method comprises the steps of transferring application data (AD) for said application (17B) and/or security domain (17A) via a communication link, in particular an over-the-air link (OTAL) from a second party (7) to the mobile device (5), wherein the service provider (9) bears responsibility for the application data (AD), characterized in that a pre-authorization is acquired by the second party (7) from the first party (3) and provided to the secure element (4), wherein the secure element (4) provides a mode in which a transfer of application data (AD) to said application (17B) and/or security domain (17A) requires pre-authorization, and wherein the second party (7) acquires as a pre-authorization a data-transfer-token (DTT) from the first party (3) via a communication link, in particular via an Internet based communication channel (IL2), wherein the data-transfer-token (DTT) is computed by the first party (3) according to a token computation algorithm by using the application data (AD) received upfront from the second party (7) and a private key of a key pair of the first party (3).

2. A method of operating a mobile communication network (1), the network (1) comprises:

at least one mobile device (5) that comprises a secure element (4), wherein a first party (3) is responsible for the secure element (4), and the secure element (4) comprises an application (17B) and/or a security domain (17A) for which a service provider (9) that is different from the first party (3) is responsible, the method comprises the steps of transferring application data (AD) for said application (17B) and/or security domain (17A) via a communication link, in particular an over-the-air link (OTAL) from a second party (7) to the mobile device (5), wherein the service provider (9) bears responsibility for the application data (AD), characterized in that a pre-authorization is acquired by the second party (7) from the first party (3) and provided to the secure element (4) wherein the secure element (4) provides a mode in which a transfer of application data (AD) to said application (17B) and/or security domain (17A) requires pre-authorization and, wherein the first party (3) logs each event or a group of events of providing a pre-authorization to said second party (7) and the logged event(s) is (are) assigned a monetary value to be paid by the second party (7) or the Service Provider (9) to the first party (3).

* * * * *